United States Patent
Emmel et al.

(10) Patent No.: US 6,799,425 B2
(45) Date of Patent: Oct. 5, 2004

(54) METHOD FOR CONVERTING THERMAL ENERGY INTO MECHANICAL WORK

(75) Inventors: Andreas Emmel, Hahnbach (DE); Dragan Stevanovic, Sulzbach-Rosenberg (DE)

(73) Assignee: Applikationa-und Technikzentrum fur Energie-Verfahrena Umwelt-und Stromungstechnik (ATZ-EVUS), Sulzbach-Rosenberg (DE)

(*) Notice: Subject to any disclaimer, the term of this patent is extended or adjusted under 35 U.S.C. 154(b) by 0 days.

(21) Appl. No.: 10/344,230

(22) PCT Filed: Aug. 7, 2001

(86) PCT No.: PCT/DE01/02939
§ 371 (c)(1),
(2), (4) Date: Mar. 4, 2003

(87) PCT Pub. No.: WO02/14663
PCT Pub. Date: Feb. 21, 2002

(65) Prior Publication Data
US 2004/0088980 A1 May 13, 2004

(30) Foreign Application Priority Data
Aug. 11, 2000 (DE) .......................................... 100 39 246

(51) Int. Cl.[7] .............................................. F01K 1/00
(52) U.S. Cl. .......................................... 60/659; 60/39.6
(58) Field of Search .................................. 60/39.6, 659

(56) References Cited

U.S. PATENT DOCUMENTS

| | | | | |
|---|---|---|---|---|
| 3,717,994 A | * | 2/1973 | Templin | ................... 60/39.511 |
| 4,610,137 A | * | 9/1986 | Nakamura et al. | ....... 60/39.511 |
| 6,092,300 A | | 7/2000 | Emmel et al. | |
| 6,167,691 B1 | | 1/2001 | Yoshikawa et al. | |
| 6,543,214 B2 | * | 4/2003 | Sasaki et al. | ................ 60/39.5 |
| 6,578,354 B2 | * | 6/2003 | Hatamiya et al. | ........ 60/39.511 |

FOREIGN PATENT DOCUMENTS

| | | |
|---|---|---|
| DE | 39 31 582 A1 | 4/1991 |
| DE | 43 17 947 C1 | 6/1994 |
| EP | 0 361 065 A1 | 4/1990 |
| EP | 0 654 591 A1 | 5/1995 |
| GB | 2 274 880 A | 8/1994 |

OTHER PUBLICATIONS

Patent Abstracts of Japan, jp 10–299423, Gasification Power Generating System.

Gericke B et al: "Biomassenverstromung Durch Vergasung Und Integrierte Gasturbinenprozesse" VGB Kraftwerkstechnik.

* cited by examiner

*Primary Examiner*—Hoang Nguyen
(74) *Attorney, Agent, or Firm*—Rankin, Hill, Porter & Clark LLP

(57) ABSTRACT

A method and apparatus for converting thermal energy into mechanical work, whereby first (4) and second devices (9) for storing thermal energy are alternately connected into a turbine branch (T). In order to increase efficiency, a compressed oxidizing gas (11) is cooled to a second temperature T2 before passing through the first device (4) for storing thermal energy, and the oxidizing gas is then increased, in one step, to a third temperature T3 when passing through the first device (4) for storing thermal energy.

24 Claims, 4 Drawing Sheets

METHOD FOR CONVERTING THERMAL ENERGY INTO MECHANICAL WORK

Figure 1:
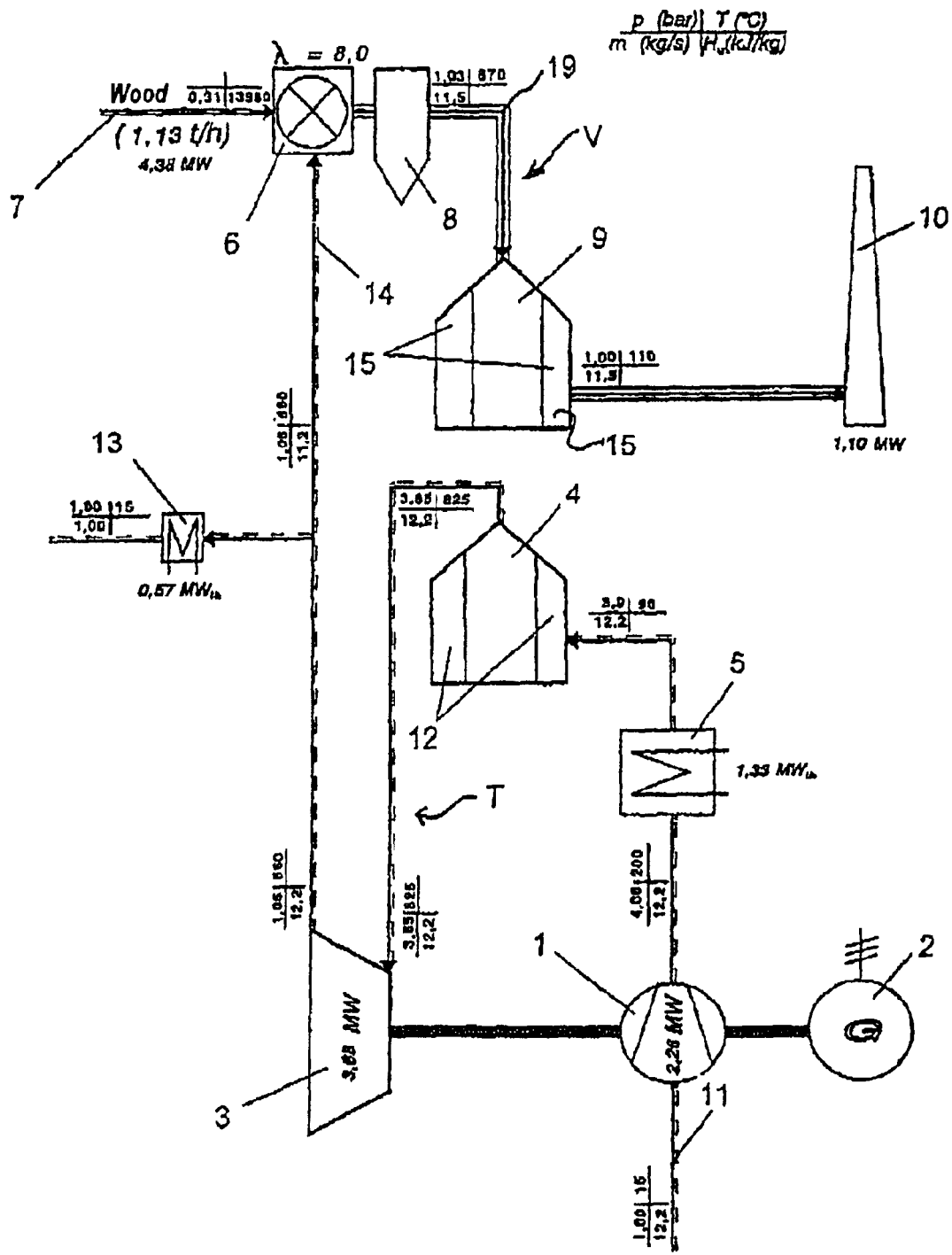

The invention relates to a method for converting thermal energy into mechanical work, a first and a second means for storing thermal energy being connected alternately into a turbine branch.

DE 43 17 947 C1 discloses a method for converting thermal energy of a gas into mechanical work. In this case, air is compressed quasi-isothermally. The compressed air is then heated isobarically by means of a regenerator. The hot compressed air is then heated further by means of burners in a second step and finally expanded into a gas turbine. Part of the hot compressed air is branched off before it enters the burner and is used for preheating the fuel required for the operation of the burner. The expanded warm waste air emerging from the gas turbine is led via a second regenerator, which is connected alternately into the turbine branch instead of the regenerator. The heating of the compressed air by means of a regenerator and a burner connected downstream is complicated. In the case in which solid fuels are used, special degassing equipment has to be provided here.

DE 44 26 356 A1 discloses an apparatus for drying green stuffs, chips and the like to produce heat and power. In this case, biomass is burned in a combustion chamber. The hot flue gas passes over a heat exchanger. There, it gives up its heat to previously compressed and therefore already heated air. The hot compressed air is expanded into a gas turbine. The warm waste air emerging from the gas turbine is used to dry chips, shavings, green stuffs or the like. However, it can also be supplied to the combustion chamber as preheated combustion air. The apparatus is primarily a drying apparatus. It is not suitable for the efficient production of power. The efficiency relating to the conversion of the thermal energy into mechanical work is not particularly high here.

EP 0 654 591 A1 discloses an apparatus for obtaining electrical energy from fuels. In this case, compressed air is heated by means of a plurality of heat exchangers connected one after another and then led to a turbine. The known apparatus is of complicated construction. It is not particularly efficient.

DE 39 31 582 A1 describes a method for using high-temperature waste heat. In this case, two regenerative heat stores are provided, which are switched alternately from a waste gas to a turbine branch. Similar methods are disclosed by Patent Abstracts of Japan JP 62085136 A and JP 61028726 A. The efficiency of these methods is improved but not optimal.

It is an object of the invention to eliminate the disadvantages of the prior art. In particular, a method is to be specified which permits efficient conversion of thermal energy obtained from the combustion of biomass into mechanical work. It is a further aim to specify a cost-effective apparatus for implementing the method.

This object is achieved by the features of claims 1 and 14. Expedient refinements emerge from the features of claims 2 to 15 and 16 to 22.

According to the invention, a method of converting thermal energy into mechanical work is provided, a first and a second means for storing thermal energy being connected alternately into a turbine branch, with the following steps:

a) compressing an oxidizing gas, its temperature being raised from ambient temperature RT to a first temperature T1 and its pressure being raised to a first pressure P1,
b) cooling the compressed gas down to a second temperature T2,
c) leading the compressed gas through a first means for storing thermal energy, the temperature of the gas being raised to a third temperature T3 in one step,
d) expanding the first pressure P1 in a gas turbine to substantially atmospheric pressure, the gas being cooled down from the third temperature T3 to a fourth temperature T4,
e) feeding the gas to a combustion chamber connected downstream,
f) burning biomass together with the gas, and
g) leading the flue gases through a second means for storing thermal energy.

The oxidizing gas considered is, for example, air, oxygen, air enriched with oxygen and the like. Because the compressed gas is raised to the third temperature in one step, that is to say without the interposition of further heat sources, the method can be managed particularly efficiently. The achievable total efficiency is around 74%.

The cooling in step b can be effected by acting with liquid, preferably water, or by means of a heat exchanger. The thermal energy obtained by the cooling in this step can be coupled out as useful heat. This increases the efficiency of the method further.

In the step c, a partial stream of the gas can be led through a bypass past the means for storing thermal energy. The waste-gas losses of the entire apparatus can thereby be reduced.

After step d, part of the gas is expediently branched off and, in order to couple out thermal energy, is led over a heat exchanger and/or brought into contact with the biomass to be burned in order to dry the latter. According to a further refining feature, dust is separated off from the flue gases formed during the combustion. The separation can be carried out, for example, by means of a cyclone.

It has proven to be particularly advantageous for the flue gas to be cooled down to a temperature of less than 150° C., preferably 90 to 110° C., in less than 200 ms in step g. This suppresses the formation of a polluting dioxines and furans.

For the temperature of the gas, it is expediently true that:

$$T2<T1<T4<T3.$$

The second temperature T2 is preferably less than 150° C., in particular less than 100° C. By means of the regenerators, gas and flue gas are preferably alternately led through a bulk material with a maximum grain diameter, which is accommodated in the annular chamber between a substantially cylindrical hot grate and a cold grate surrounding the latter, and at least one discharge opening for discharging the bulk material being provided in the bottom of the annular chamber, a predefined quantity of bulk material being discharged while or after the flue gas is led through, so that a compressive stress exerted on the hot and cold grates by the bulk material is reduced. The average grain size of the bulk material is preferably less than 15 mm. The so-called bulk material regenerators operated in accordance with the aforementioned method are particularly efficient and not likely to need repair.

The bulk material discharged can be fed back by means of a transport gas into the annular chamber. In the process, after the bulk material has been separated from the transport gas, a dust fraction contained therein is separated off. The function of the filling as a filter for dedusting the process gas led through is maintained. Furthermore, the transport gas discharged into the environment is unloaded.

In order to manage the process quasi-continuously, a third means for storing thermal energy can be connected into the turbine branch in alternation with the first or second means for storing thermal energy.

According to a further measure of the invention, an apparatus for converting thermal energy into mechanical work is proposed, the following being provided:
  a turbine branch comprising:
    a compressor for compressing an oxidizing gas taken in,
    a means connected downstream for cooling down the compressed gas,
    a first bulk material regenerator connected downstream of the cooling means,
    a gas turbine connected downstream of the first bulk material regenerator,
  and a preheating branch comprising
    a combustion chamber connected downstream of the first bulk material regenerator,
    a second bulk material regenerator connected downstream of the combustion chamber and
    a means for the alternate connection of the second bulk material regenerator into the turbine branch and the connection of the first bulk material regenerator into the preheating branch.

The bulk material regenerators used here are preferably the bulk material regenerators disclosed by DE 42 36 619 C2 or EP 0 908 692 A2. The disclosure content of the aforementioned documents is hereby incorporated. The use of such bulk material regenerators leads to an apparatus which operates particularly efficiently.

The gas turbine, the compressor and a generator are expediently arranged on one shaft. As a result of the direct transfer of the mechanical work from the gas turbine to the compressor and the generator, frictional losses are avoided.

According to a further configuration feature, the combustion chamber can have a flue gas cleaning device connected downstream. Furthermore, a heat exchanger for coupling thermal energy out can be connected in between the gas turbine and the combustion chamber. The aforementioned features contribute further to environmental compatibility and to increasing the efficiency of the apparatus.

According to a particularly preferred configuration feature, a substantially cylindrical hot grate in the bulk material regenerator is surrounded coaxially by a cold grate, and a bulk material with a maximum grain diameter $D_{max}$ is accommodated in an annular chamber formed between the hot and the cold grates, the hot and/or cold grates being constructed in such a way that the bulk material can expand radially when heated. Such a bulk material regenerator has a particularly long service life. For details, reference is made to EP 0 908 692 A2. Such bulk material regenerators are distinguished by particularly low energy losses and high heat recovery.

With the apparatus according to the invention, high electrical efficiencies can be achieved even at low electrical outputs, that is to say less than 2 MW. Furthermore, by means of the apparatus according to the invention, heat can be coupled out and supplied to a separate circuit, for example as useful heat for drying purposes.

Figure 2:
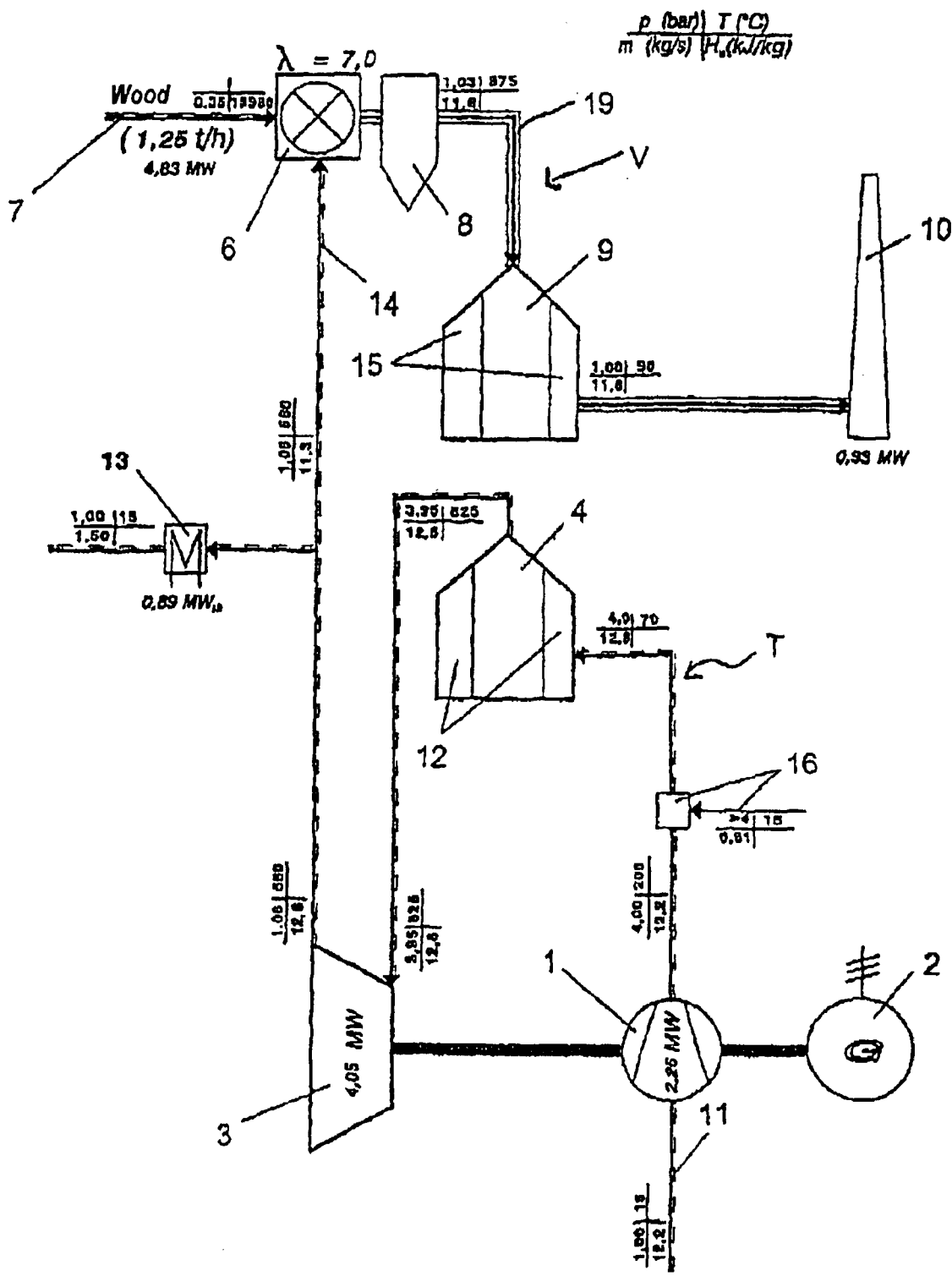
Figure 3:
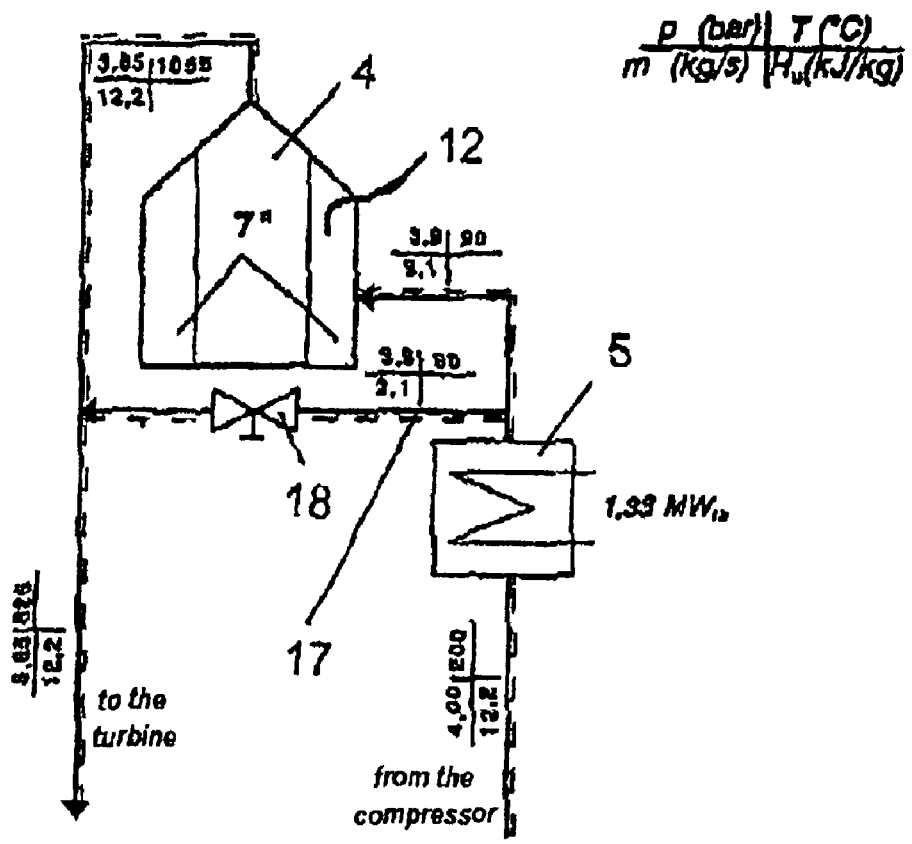
Figure 4:
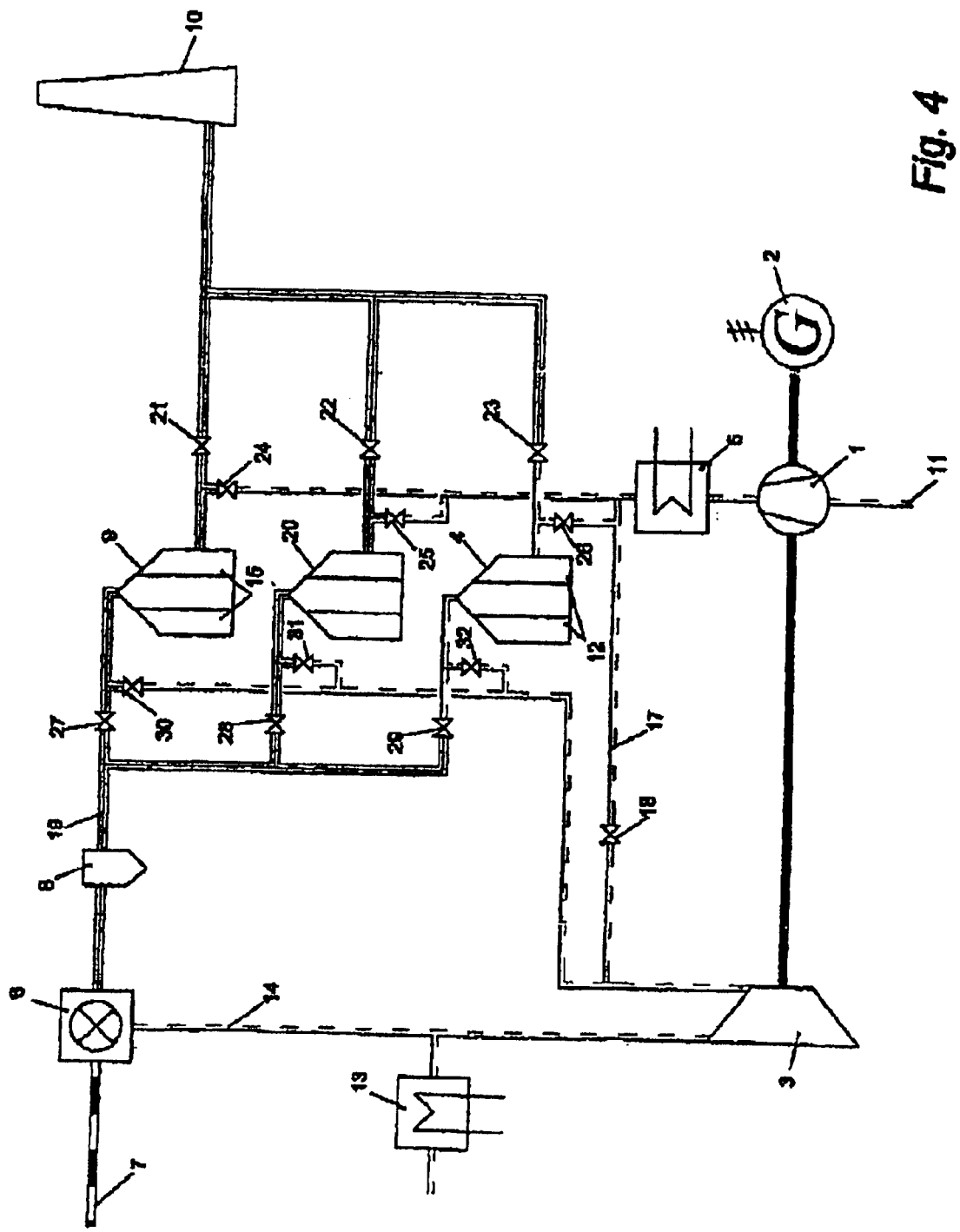

In the following text, exemplary embodiments of the invention will be explained in more detail using the drawing, in which:

FIG. 1 shows a first flowchart,
FIG. 2 shows a second flowchart,
FIG. 3 shows a third flowchart, and
FIG. 4 shows a fourth flowchart.

A first apparatus for the conversion of thermal energy into mechanical work is shown schematically in FIG. 1.

In the turbine branch T, a compressor 1 with a generator 2 is arranged on the shaft of a gas turbine 3. A first heat exchanger 5 is connected into a line leading from the compressor 1 to a first regenerator 4. A line leads from the first regenerator 4 to the gas turbine 3. The waste air emerging from the gas turbine 3 is supplied, as preheated combustion air, to a combustion chamber 6 via a further line. The combustion chamber 6 is a constituent part of a preheating branch designated by the reference symbol V. As a further raw material for the combustion, biomass designated by the reference symbol 7 is supplied to the combustion chamber 6. The flue gas 19 formed is cleaned by a flue gas dedusting apparatus, for example a cyclone 8, and supplied to a second regenerator 9. The cooled flue gas 19 finally passes from the second regenerator 9 into the chimney 10. The first 4 and the second regenerator 9 are preferably constructed as bulk material regenerators.

The function of the apparatus is as follows: air designated by the reference symbol 11 is taken in by the compressor 1 at an ambient temperature RT of about 15° C. and compressed to a first pressure P1 of about 4 bar. In the process, the temperature of the air 11 rises to a first temperature T1 of about 200° C. In the first heat exchanger 5, the compressed air 11 is cooled down to a second temperature T2 of about 90° C. The first pressure P1 remains substantially constant. At the input to the first regenerator 4 it is about 3.9 bar. The air 11 is led through a first annular chamber 12 in the first regenerator 4, in which hot bulk material, for example $Al_2O_3$ spheres with a diameter of about 8 mm, is accommodated as a heat store. As a result of the air 11 being led through the hot bulk material, the air 11 is raised to a third temperature of about 825° C. The pressure of the compressed air 11 remains substantially unchanged. At the input to the gas turbine 3 it is about 3.85 bar. The hot compressed air 11 is then expanded via the gas turbine 3 and converted into mechanical work. The expanded air leaves the gas turbine 3 at a temperature of about 560° C. and a pressure of 1.06 bar, corresponding approximately to atmospheric pressure. This air is supplied to the combustion chamber 6 as preheated combustion air 14. Excess preheated combustion air 14 can be coupled out, and its thermal energy can be converted into useful heat by a second heat exchanger 13. As a result of the combustion of the biomass 7 with the preheated combustion air 14, hot flue gases 19 at a temperature of about 870° C. are produced. The hot flue gases 19 are dedusted in the flue gas cleaning device 8. They are then led through the annular chamber 15 of the second regenerator 9 and, after cooling down to about 110° C., are discharged to the environment via the chimney 10.

By means of an apparatus not shown here, the first 4 and the second regenerator 9 can be operated alternately in the turbine branch T and in the preheating branch V.

In the apparatus shown in FIG. 2, instead of the first heat exchanger 5, an apparatus 16 for injecting liquid is connected into the turbine branch T. By means of this apparatus, it is possible to set the second temperature T2 to about 70° C. It is therefore possible to achieve a particularly high output from the gas turbine 3. The efficiency of the power generation can therefore be increased to 34.4%. At the same time, the total efficiency falls to about 53%, because of the reduced heat output.

As can be seen from FIG. 3, it is also possible to store heat at a higher temperature of up to 1100° C. in the first regenerator 4 connected into the turbine branch T. In this case, the temperature of the preheated air at the output of the first regenerator 4 is around 1055° C. Before entering the gas turbine 3, it then has to be cooled by means of a bypass 17, using a partial stream of cooler air from the first heat exchanger 5. By means of a control valve 18, the inlet temperature of the air into the gas turbine can be set to 825° C. In this way, a low flow can be set in the second regenerator 9. The quantity of flue gas 19 is reduced. The waste-gas and chimney losses are reduced. The efficiency of the method is increased.

FIG. 4 shows an apparatus in which, in addition to the first 4 and the second regenerator 9, a third regenerator 20 is provided. The third regenerator 20 can be connected into the turbine branch T or the preheating branch V in alternation with the first 4 and the second regenerator 9. For this purpose, changeover valves 21 to 32 are provided in the corresponding lines.

List of Reference Symbols
1 Compressor
2 Generator
3 Gas turbine
4 First regenerator
5 First heat exchanger
6 Combustion chamber
7 Biomass
8 Cyclone
9 Second regenerator
10 Chimney
11 Air
12 First annular chamber
13 Second heat exchanger
14 Combustion air
15 Second annular chamber
16 Device for water injection
17 Bypass
18 Control valve
19 Flue gas
20 Third regenerator
21–32 Changeover valves
T Turbine branch
V Preheating branch

What is claimed is:

1. A method for converting thermal energy into mechanical work, a first (4) and a second means (9) for storing thermal energy being connected alternately into a turbine branch (T), comprising the steps of:
    a) compressing an oxidizing gas (11) such that a temperature of the oxidizing gas is raised from ambient temperature RT to a first temperature T1 and the pressure of the oxidizing gas is raised to a first pressure P1,
    b) cooling the oxidizing gas (11) down to a second temperature T2,
    c) leading the oxidizing gas (11) through the first means (4) for storing thermal energy, the temperature of the gas (11) being raised to a third temperature T3 in one step,
    d) expanding the oxidizing gas in a gas turbine (3) to substantially atmospheric pressure, the oxidizing gas (11) being cooled down from the third temperature T3 to a fourth temperature T4,
    e) feeding the oxidizing gas (11, 14) to a combustion chamber (6) connected downstream,
    f) burning biomass (7) together with the oxidizing gas (14), and
    g) leading flue gases (19) through the second means (9) for storing thermal energy.

2. The method according to claim 1, wherein cooling in step b) is effected by acting on the gas (11) with liquid or by means of a heat exchanger.

3. The method according to claim 1, wherein the thermal energy obtained by the cooling in step b) is coupled out as useful heat.

4. The method according to claim 1, wherein, in step c), a partial stream of the gas (11) is led through a bypass past the means (4, 9) for storing thermal energy.

5. The method according to claim 1, wherein, after step d), part of the gas (14) is branched off and led over a heat exchanger (13) in order to couple out thermal energy.

6. The method according to claim 1, wherein, after step d), part of the gas (14) is branched off and brought into contact with the biomass (7) to be burned, in order to dry the latter.

7. The method according to claim 1, wherein dust is separated off from the flue gases (19) formed during the combustion.

8. The method according to claim 1, wherein, in step g), the flue gases (19) are cooled down to a temperature of less than 150° C. in less than 200 ms.

9. The method according to claim 1, wherein the temperatures of the gases satisfy the equation:

$$T2 < T1 < T4 < T3$$

10. The method according to claim 1, wherein the second temperature T2 is less than 150° C., preferably less than 100° C.

11. The method according to claim 1, wherein gas and combustion gas being led alternately through the means (4, 9) for storing thermal energy, constructed as bulk material regenerators, through bulk material having a maximum grain diameter ($D_{max}$), which is accommodated in the annular chamber (12, 15) between a substantially cylindrical hot grate and a cold grate surrounding the latter, and at least one discharge opening for discharging the bulk material provided in the bottom of the annular chamber (12, 15), a predefined quantity of bulk material being discharged while or after flue gas (19) is led through, so that a compressive stress exerted on the hot and cold grates by the bulk material is reduced.

12. The method according to claim 10, wherein the maximum grain diameter ($D_{max}$) of the bulk material is less than 15 mm.

13. The method according to claim 11, wherein the discharged bulk material is fed back to the annular chamber by a transport gas.

14. The method according to claim 13, wherein, after the bulk material has been separated from the transport gas, a dust fraction contained therein is separated off.

15. The method according to claim 1, wherein a third means for storing thermal energy is connected into the turbine branch (T) in alternation with the first (4) or second means (9) for storing thermal energy.

16. An apparatus for converting thermal energy into mechanical work, said apparatus comprising:
    a turbine branch (T) comprising:
        a compressor (1) for compressing an oxidizing gas (11) taken in,
        cooling means (5, 16) connected downstream of the compressor for cooling down the compressed gas (11),
        a first bulk material regenerator (4) connected downstream of the cooling means (5, 16),
        a gas turbine (3) connected downstream of the first bulk material regenerator (4),
    and a preheating branch (V) comprising:
        a combustion chamber (6) connected downstream of the first bulk material regenerator (4), a second bulk material regenerator (9) connected downstream of the combustion chamber (6) and means (21, 32) for alternatively connecting the second bulk material regenerator (9) into the turbine branch (T) and the first bulk material regenerator (4) into the preheating branch (V).

17. The apparatus according to claim 16, wherein the gas turbine (3), the compressor (1), and a generator (2) are arranged on one shaft.

18. The apparatus according to claim 16, further comprising a flue gas cleaning device (8) connected downstream of the combustion chamber (6).

19. The apparatus according to claim 16, further comprising a heat exchanger (13) for coupling thermal energy out, said heat exchanger being connected in between the gas turbine (3) and the combustion chamber (6).

20. The apparatus according to claim 16, wherein a substantially cylindrical hot grate in the bulk material regenerator (4, 9) is surrounded coaxially by a cold grate, and a bulk material with a maximum grain diameter ($D_{max}$) is received in an annular chamber (12, 15) formed between the hot and the cold grates, the hot and/or cold grates being constructed such that the bulk material is permitted to expand radially when heated.

21. The apparatus according to claim 16, wherein the first and second bulk material regenerators (4, 9) are provided with a bypass (17).

22. The apparatus according to claim 16, further comprising a third bulk material regenerator (20), and the means (21–32) for alternate connection also being suitable to connect the third bulk material regenerator (9) into the turbine branch (T) and into the preheating branch (V).

23. Method according to claim 1, wherein, in step g), the flue gases (19) are cooled down to a temperature of between about 90 to 110° C. in less than 200 ms.

24. The method according to claim 1, wherein the second temperature T2 is less than 100° C.

* * * * *